United States Patent
Schneider et al.

[11] Patent Number: 5,537,909
[45] Date of Patent: Jul. 23, 1996

[54] ALL-ASPECT BOMB DAMAGE ASSESSMENT SYSTEM

[75] Inventors: Arthur J. Schneider, Tucson; James G. Small, both of AZ; Donald E. French, Westlake, Calif.; Henry August, Tucson, Ariz.

[73] Assignee: Hughes Missile System Company, Los Angeles, Calif.

[21] Appl. No.: 423,391

[22] Filed: Apr. 17, 1995

[51] Int. Cl.⁶ .................... B64D 1/04; F42B 15/00
[52] U.S. Cl. ................ 89/1.11; 102/293; 244/3.24
[58] Field of Search ................ 89/1.11; 102/293, 102/386, 387, 388, 393; 244/3.24

[56] References Cited

U.S. PATENT DOCUMENTS

| | | | |
|---|---|---|---|
| 3,724,373 | 4/1973 | Rivenes | 102/387 |
| 3,948,175 | 4/1976 | Bucklisch | 102/393 |
| 4,372,215 | 2/1983 | Crepin | 102/387 |
| 4,844,381 | 7/1989 | Brieseck et al. | 102/393 |
| 4,869,441 | 9/1989 | Steuer | 102/393 |
| 4,878,433 | 11/1989 | Pirolli | 102/387 |
| 5,056,740 | 10/1991 | Roth et al. | 89/1.11 |
| 5,339,742 | 8/1994 | Hulderman et al. | 102/387 |
| 5,467,681 | 11/1995 | Liberman | 89/1.11 |

Primary Examiner—Michael J. Carone
Assistant Examiner—Theresa M. Wesson
Attorney, Agent, or Firm—Charles D. Brown; Wanda Denson-Low

[57] ABSTRACT

A bomb damage assessment system that is carried by a weapon and released to provide imagery of a bombed area before and after bomb delivery. The system comprises a glider that is releasably secured to the weapon that includes tracking and guidance electronics for programmably controlling the flight thereof. An imaging system is disposed in the front end of the glider and a deployable ballute is disposed at the rear end thereof. A data link is provided for transmitting images to a command center for review. The system provides imagery of a target area before, during and after weapon impact. Television or infrared cameras may be used for day or night missions. As a target area is approached, the glider is released, is decelerated by the ballute, wings are unfolded, and the ballute is released, resulting in an aerodynamic vehicle that flies much slower than the weapon. The imaging system tracks the weapon to impact. The explosion of the weapon produces a hot spot that is tracked by the imaging system. The hot spot is tracked until a preselected depression angle is reached. The glider banks until the hot spot is at a predetermined angle relative to the centerline thereof. This results in a spiral glide path around the hot spot so that the target area is viewed from all aspects. The spiral path also results in a monotonically decreasing range to the hot spot. The glider may employ a GPS receiver, and the target location in GPS coordinates may be entered into the guidance and control system. The glider may be programmed to fly along a specific path or geometric surface in GPS coordinates toward the target. Using a fixed field of view imaging system, a large amount of background is seen from long range and better linear resolution is obtained at short range until the glider descends to the ground. Bomb damage assessment may be performed at the command center within minutes of weapon impact.

14 Claims, 11 Drawing Sheets

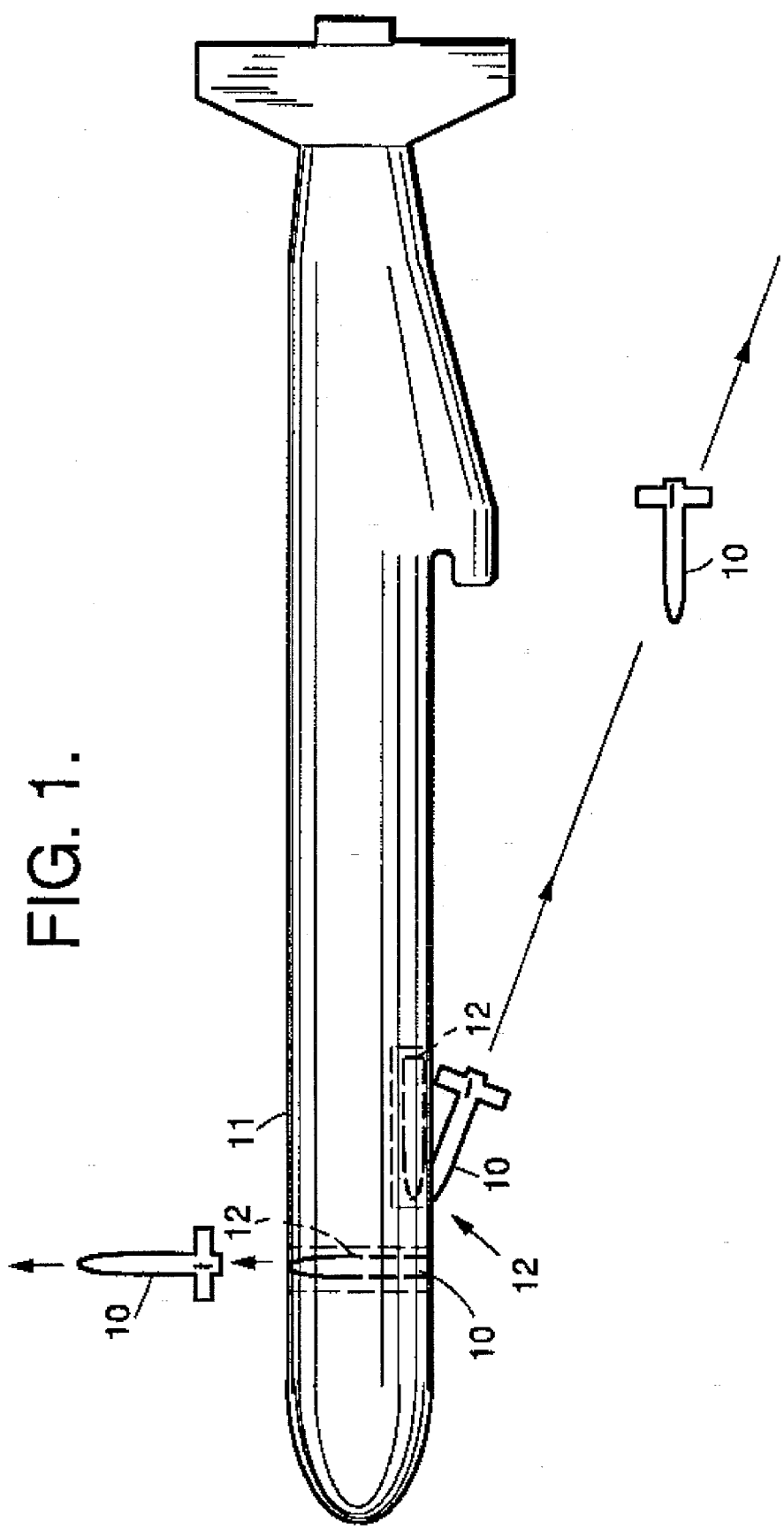

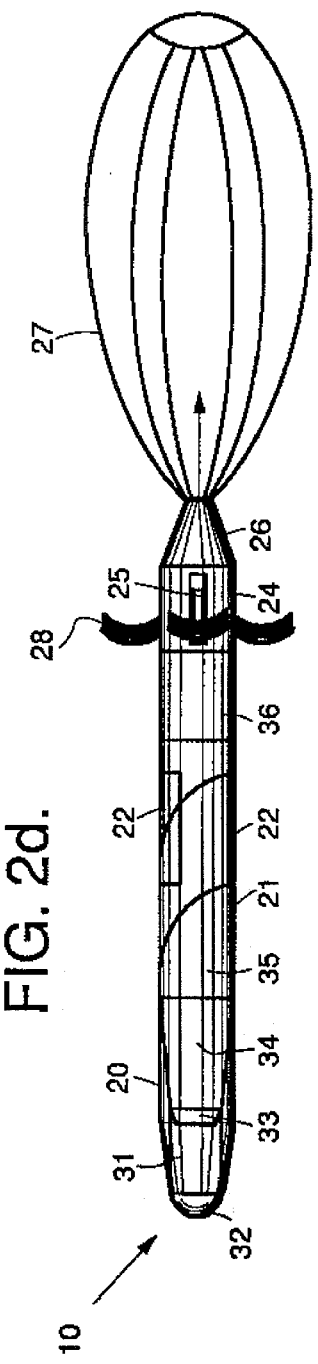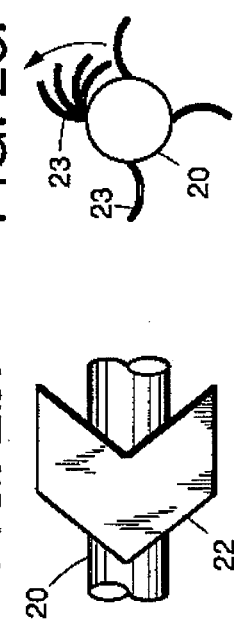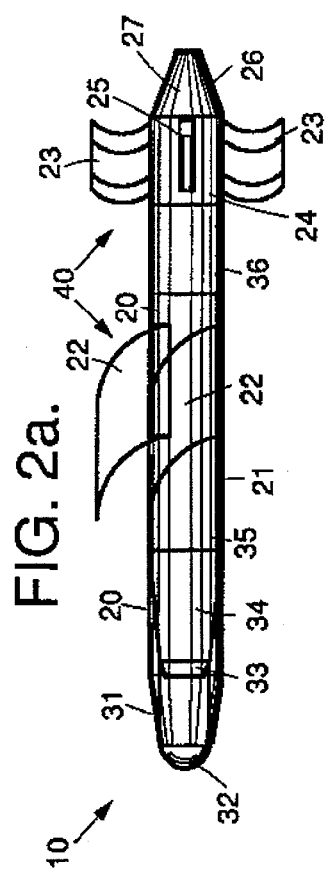

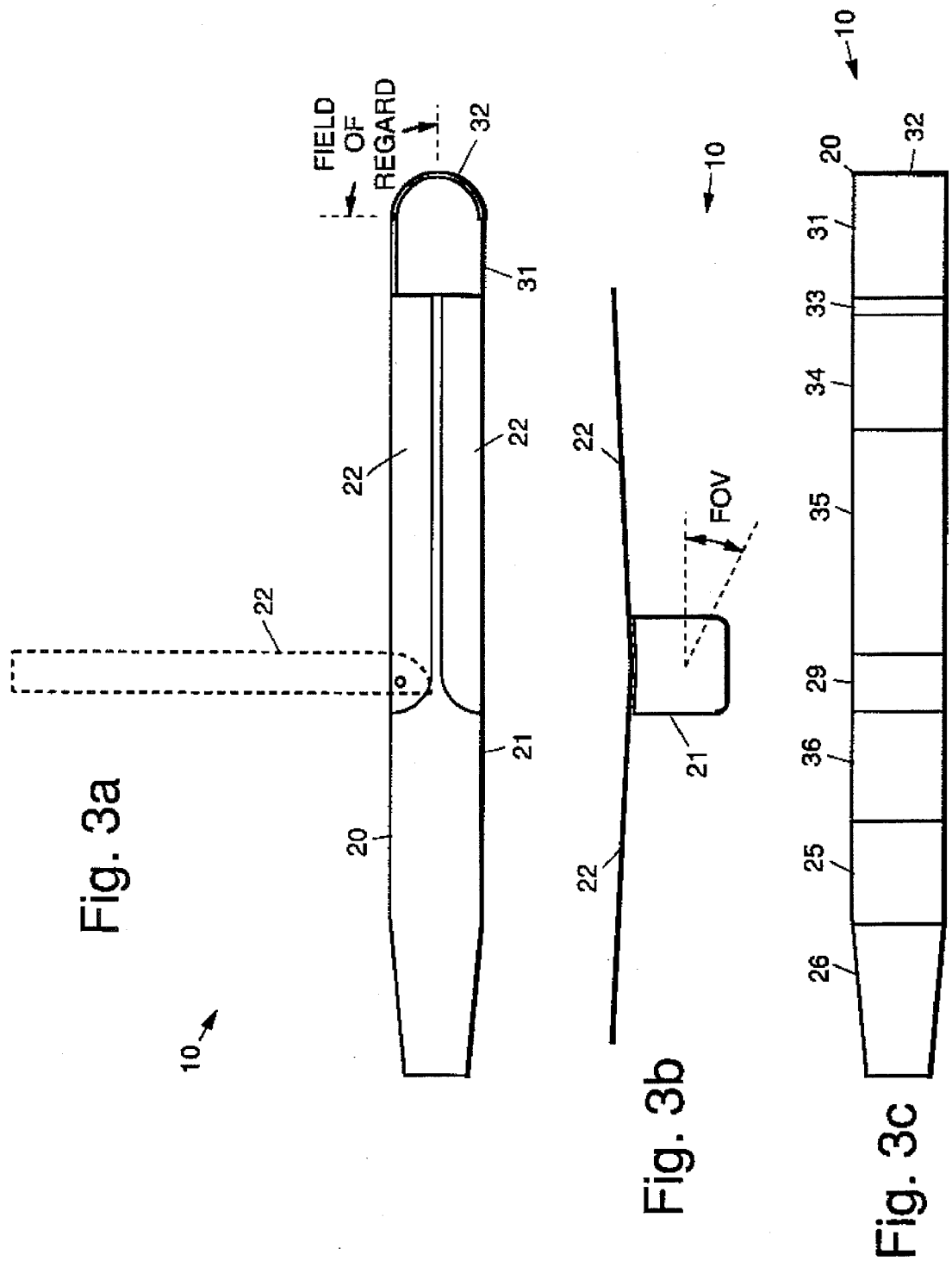

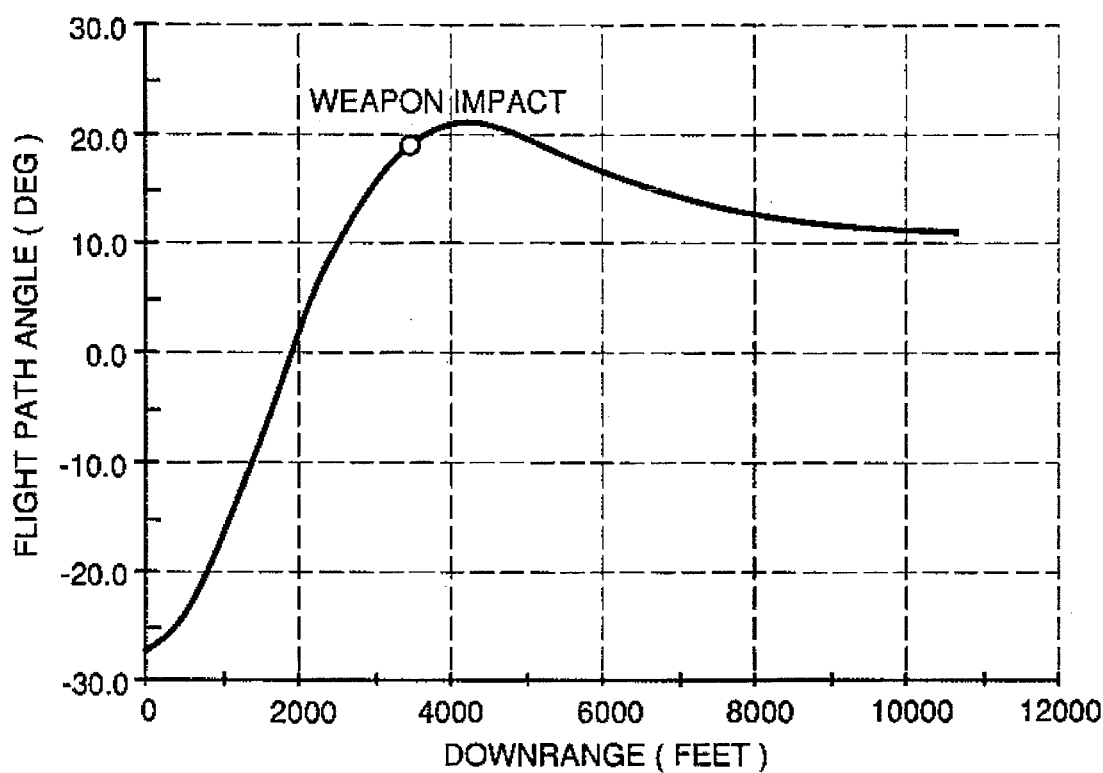
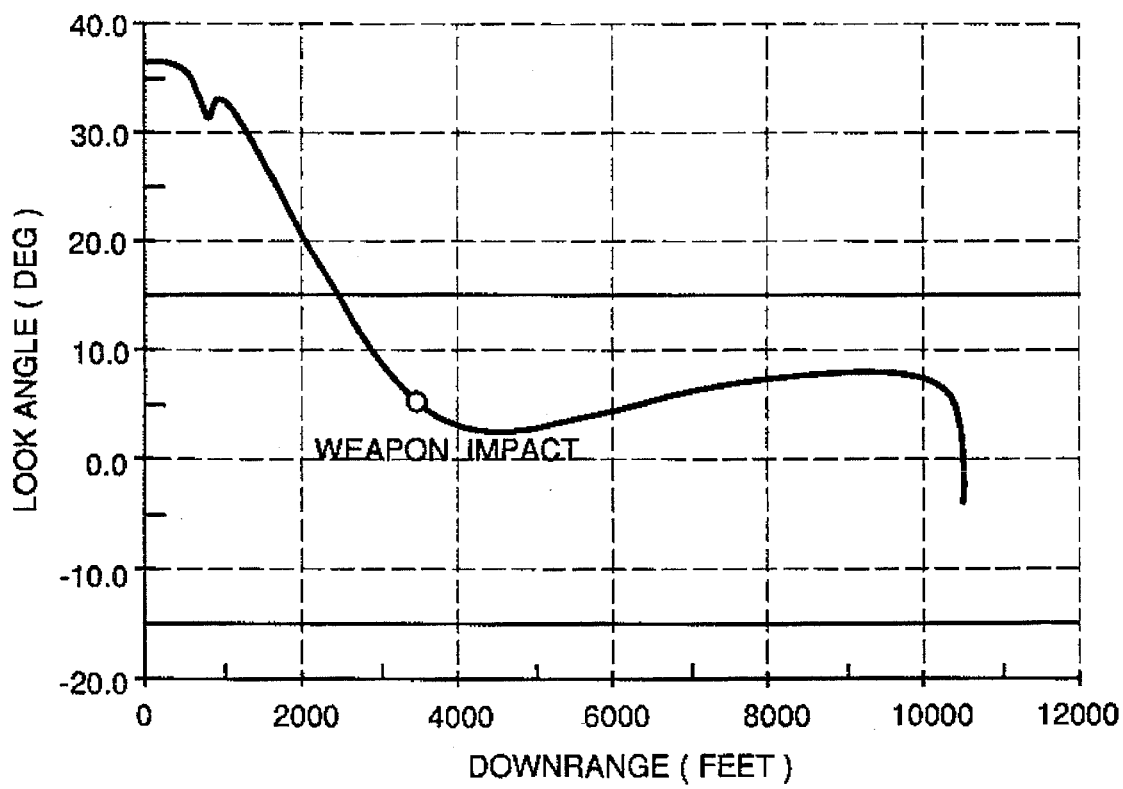

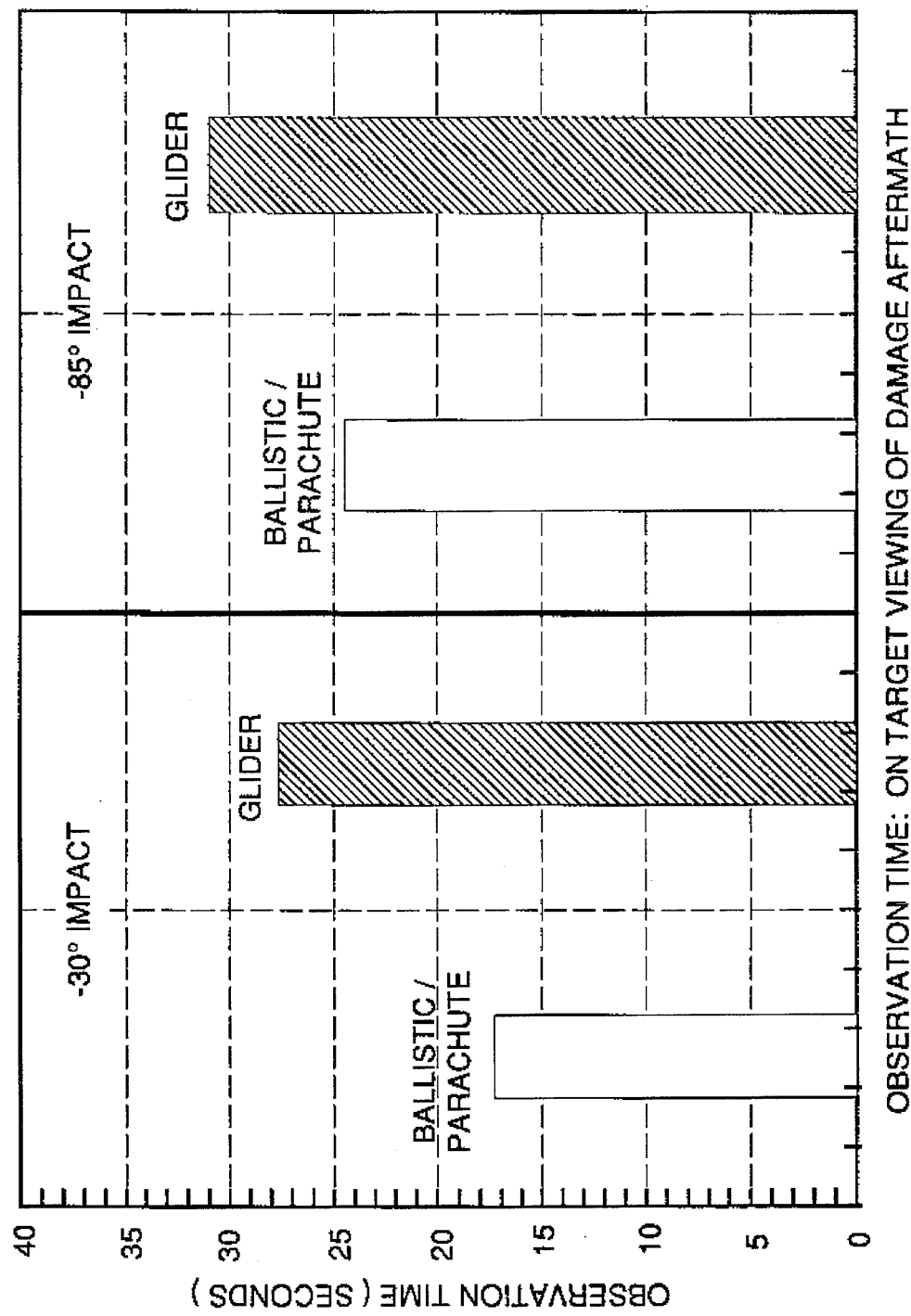

ALL-ASPECT BOMB DAMAGE ASSESSMENT SYSTEM

BACKGROUND

The present invention relates generally to bomb damage assessment systems, and more particularly to an all-aspect piggyback bomb damage assessment system for missiles comprising an imaging system that is piggybacked to a weapon to provide imagery of a bombed area before and after weapon impact.

The advantage of timely target area damage assessment during wartime is so great that it is hard to overstress. For example, in the Tomahawk missile attack against the intelligence headquarters of the Iraqi government, five missiles strayed from their assigned targets, causing serious collateral damage to civilians. Iraqi spokesmen immediately appeared on worldwide television accusing the United States of inhumane warfare. Because the military did not know where the errant missiles hit for some time, the military and political leaders were unable to comment intelligently on the situation, and were upset as a result. Clearly, sporadic combat under difficult conditions places a premium on rapid and accurate assessment of bomb damage. Under normal combat conditions, rapid accurate assessment of damage enables commanders to deploy their assets to greatest advantage.

Previous methods of obtaining bomb damage assessment utilize reconnaissance aircraft, unmanned air vehicles (UAVs), and satellites. Unmanned air vehicles have been used to carry cameras that either record or relay imagery back to an operating base. The unmanned air vehicles are relatively expensive, but may be re-used. Coordination of the flight of the unmanned air vehicle with the attack of the target area is required, and the target must be within the operating range of the unmanned air vehicle.

Reconnaissance aircraft have been used that generally operate at high altitude and require clear weather to assess the target area. In essence, reconnaissance aircraft represent a very expensive long range version of an unmanned air vehicle. Reconnaissance aircraft are limited to low hazard areas and may be obscured clouds and other obscurants if forced to operate from high altitudes. Both aircraft and unmanned air vehicles must be coordinated with the attack if they are to produce timely outputs.

Satellites incorporating television or infrared cameras have been used as bomb damage assessment systems. Bombed areas are imaged using the cameras after bomb delivery. However, imaging results are dependent upon good weather in target areas. There is also a time delay until the satellite passes above the target area. Furthermore, satellite systems are relatively expensive to operate. However, satellite orbits are predetermined, and may not be timely with regard to a particular event. In addition, control of the satellites is subject to administrative procedures before they can be made available to tactical commanders, adding a time delay to the assessment process.

Therefore, it is an objective of the present invention to provide an all-aspect bomb damage assessment system. It is a further objective of the present invention to provide a bomb damage assessment system that may be piggybacked to a bomb to provide imagery of a bombed area immediately before and after weapon impact.

SUMMARY OF THE INVENTION

In order to meet the above and other objectives, the present invention is an all-aspect bomb damage assessment system that comprises a glider containing an imaging system that is carried by an air-to-ground weapon and released prior to weapon impact and which provides imagery of a target area before, during and after weapon delivery. The glider has folding wings and/or fins, and may be carried internally or externally by the weapon. As the target area is approached, the glider is released or ejected, is decelerated by a deployable ballute, the wings and/or fins are unfolded, and the ballute is released, resulting in an aerodynamic glider configuration that flies much slower than the weapon. The glider arrives at the target area approximately 30 to 60 seconds after impact of the weapon. The glider is equipped with an imaging system or sensor capable of night vision and daytime vision, and programmable tracking and guidance electronics comprising a guidance and control system for controlling the flight thereof.

In operation, shortly after separation from the weapon, the imaging system tracks the weapon to impact. The explosion releases a burst of heat that temporarily results in a "white out" of the image scene viewed by the imaging system. The imaging system continues to look at the point of impact and normal vision returns after a few seconds. The burst leaves a hot spot at the target area that is tracked by the imaging system. The hot spot is tracked until a preselected depression angle is reached.

At this point, the glider, using its programmable guidance electronics, is caused to turn until the target hot spot is at 90 degrees relative to the centerline of the glider. For example, if 80 degrees is the selected angle, the glider is programmed to turn so that an angle of 80 degrees relative to the hot spot is maintained. This results in the glider travelling a spiral glide path around the hot spot so that the target area is viewed from all aspects. The spiral path also results in a monotonically decreasing range to the hot spot. Using a fixed field of view imaging sensor in the imaging system, a large amount of background is seen from long range and good linear resolution is obtained at short range until the glider descends to the ground. Because the glider descends to low altitudes, it operates under most cloud ceilings and has a better opportunity to penetrate fog, smoke, and haze.

In addition to hot spot tracking, the glider of the present invention may also employ GPS (global positioning system) guidance. The glider may include a GPS receiver integrated into the guidance and control system. The target location in GPS coordinates may be entered into the guidance and control system. When the glider is released from the weapon, it may be programmed using the programmable processor and guidance and flight control system to fly along a specific path or geometric surface in GPS coordinates, such as along a converging cone centered in the coordinates of the target, for example.

Imagery produced by the imaging system is relayed to a combat command center via satellite, aircraft, or unmanned air vehicle, for example by an on-board communications link. The imagery is then assessed to evaluate damage and plan further strikes if needed. Multiple sensor channels may be provided as part of the imaging system to handle multiple weapon attacks. The present invention provides high quality damage assessment imagery on a timely basis, typically within two to five minutes of weapon impact.

A low cost version of the bomb damage assessment system may utilize a television camera or a low light level night vision sensor instead of an infrared camera in the imaging system and eject parachute supported flares over the target area to provide illumination at night. To lower the cost further, the glider may be programmed to fly straight at the target, providing imagery from a single viewing aspect.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIG. 1 illustrates a weapon deploying an all-aspect piggyback bomb damage assessment system in accordance with the principles of the present invention;

FIG. 2a illustrates a first embodiment of the all-aspect piggyback bomb damage assessment system of the present invention;

FIG. 2b illustrates a partial view of the system of FIG. 2a with wings deployed;

FIG. 2c illustrates a rear end view of the system of FIG. 2a with tail fins deployed;

FIG. 2d illustrates the bomb damage assessment system in an operable state having its ballute and speed brakes deployed;

FIGS. 3a–3c illustrate top, front, and exposed side views of a second embodiment of the all-aspect piggyback bomb damage assessment system of the present invention;

FIGS. 4–15 illustrate graphs showing the performance of the all-aspect piggyback bomb damage assessment system; and FIG. 16 is a chart comparing the present bomb damage assessment system and a conventional parachute assisted assessment system.

DETAILED DESCRIPTION

Figure 2E:
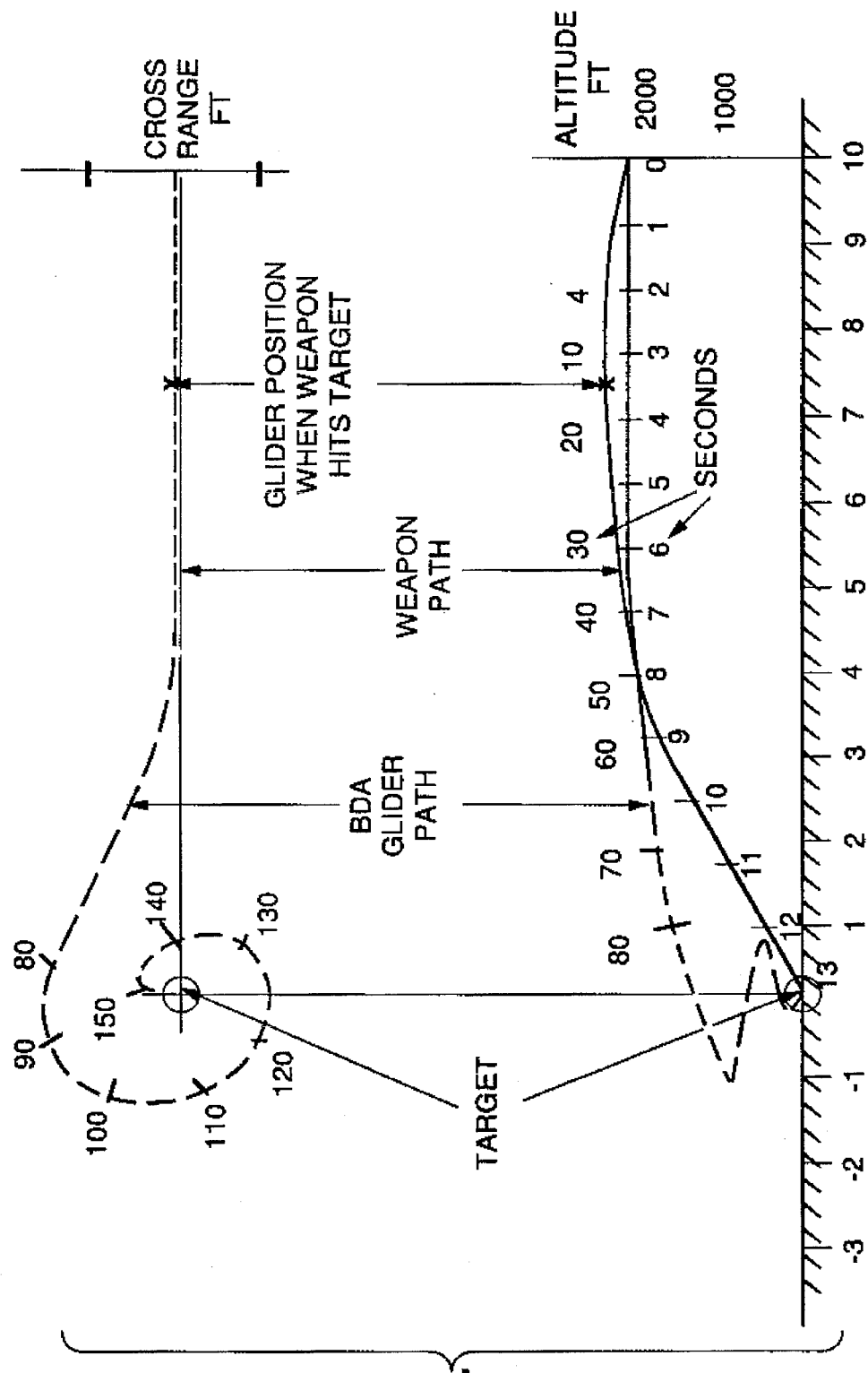
FIG. 2e illustrates a typical glide path of the all-aspect piggyback bomb damage assessment system of FIG. 1.
Figure 4:
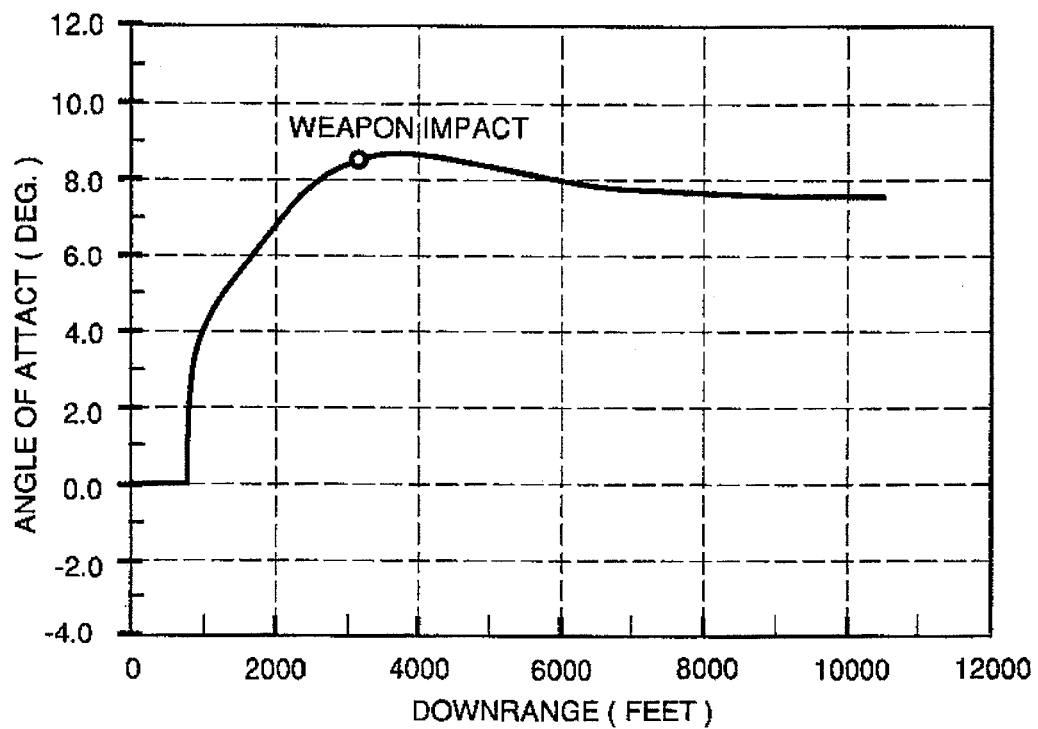
Figure 5:
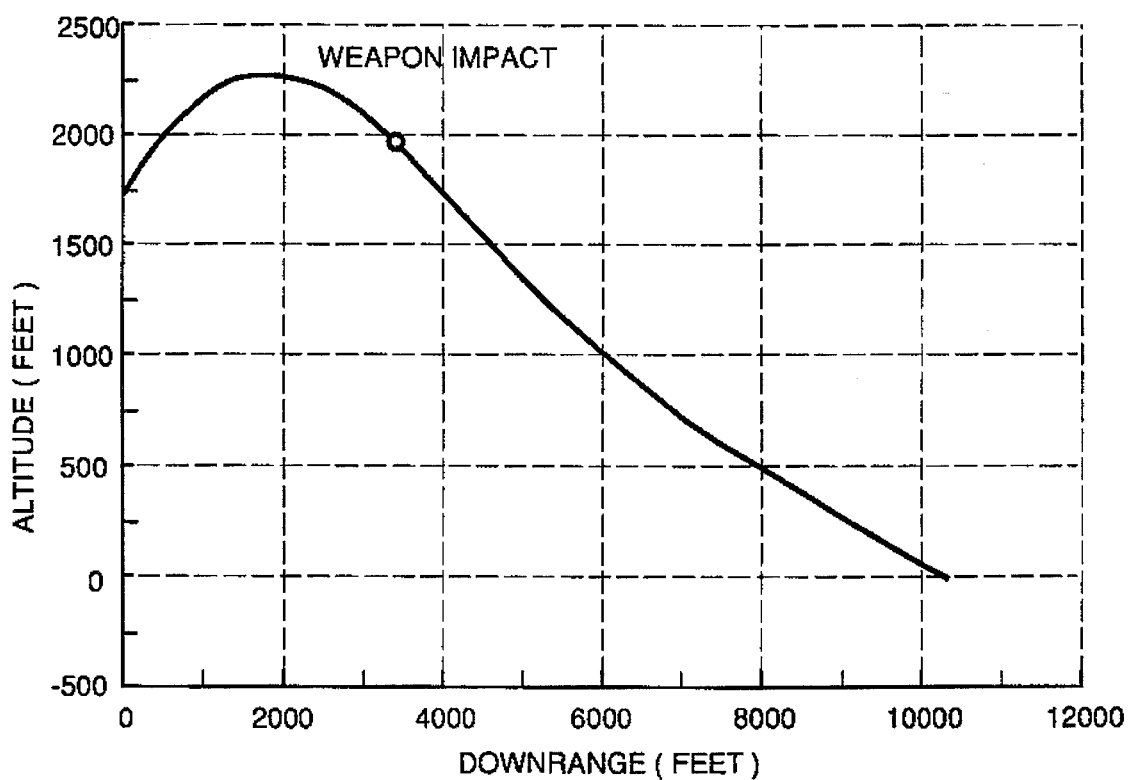
Figure 6:
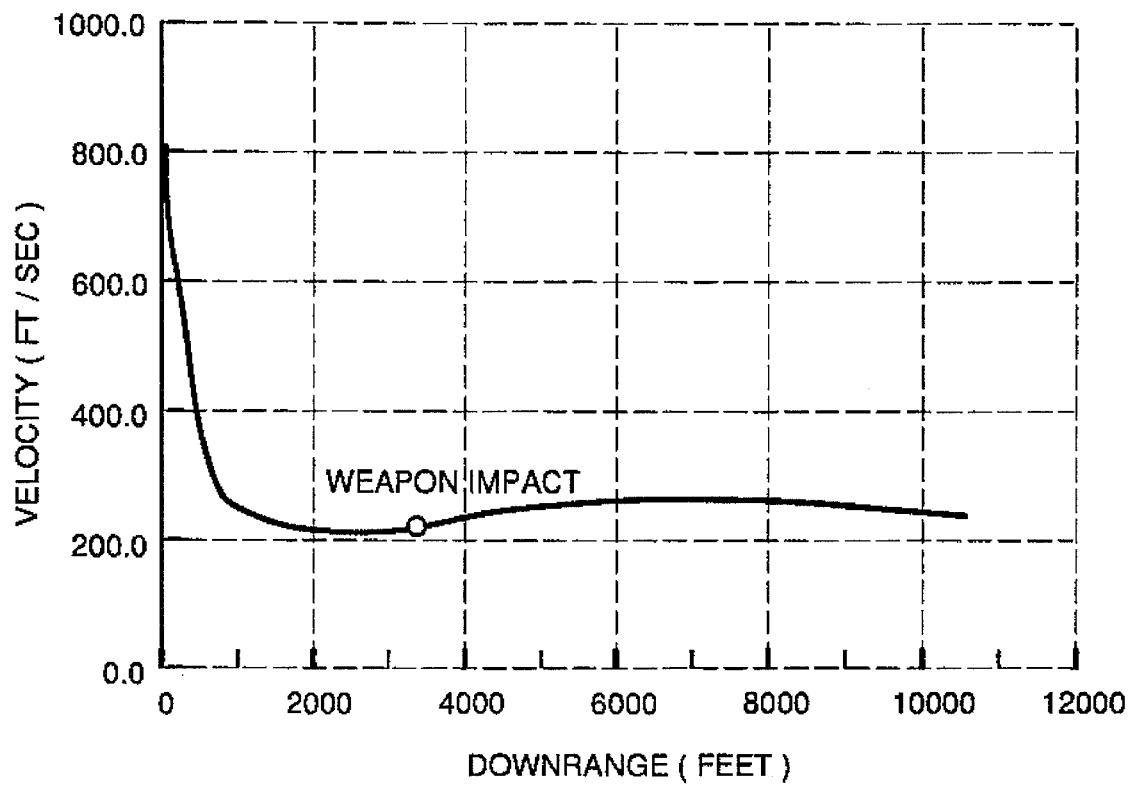
Figure 7:
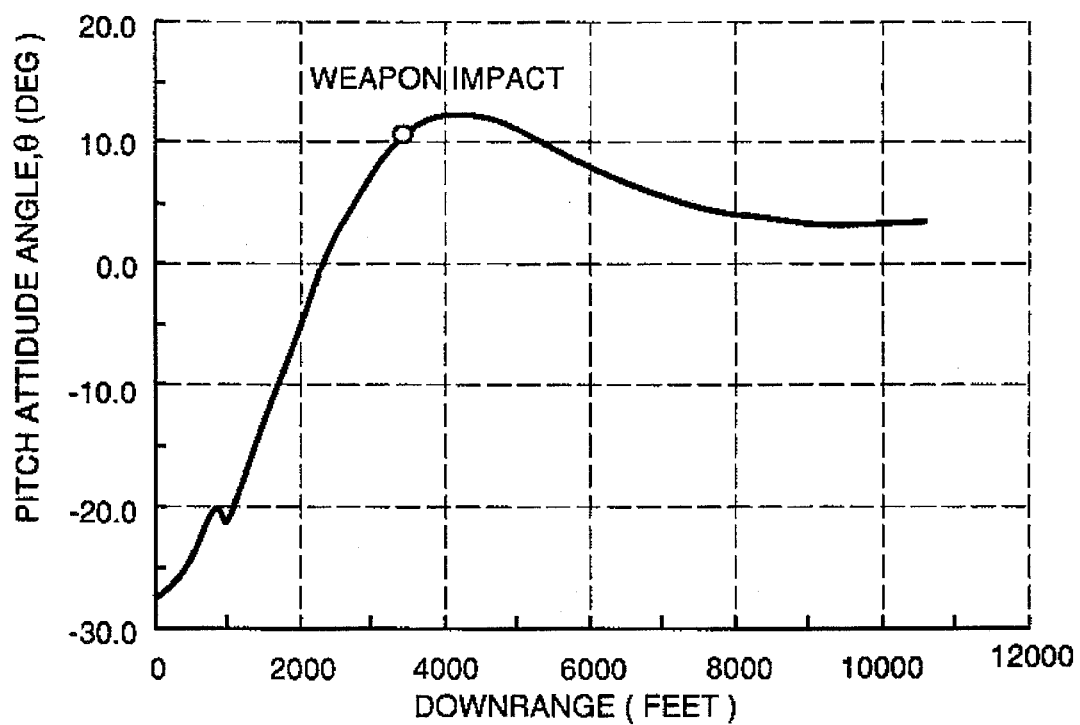
Figure 10:
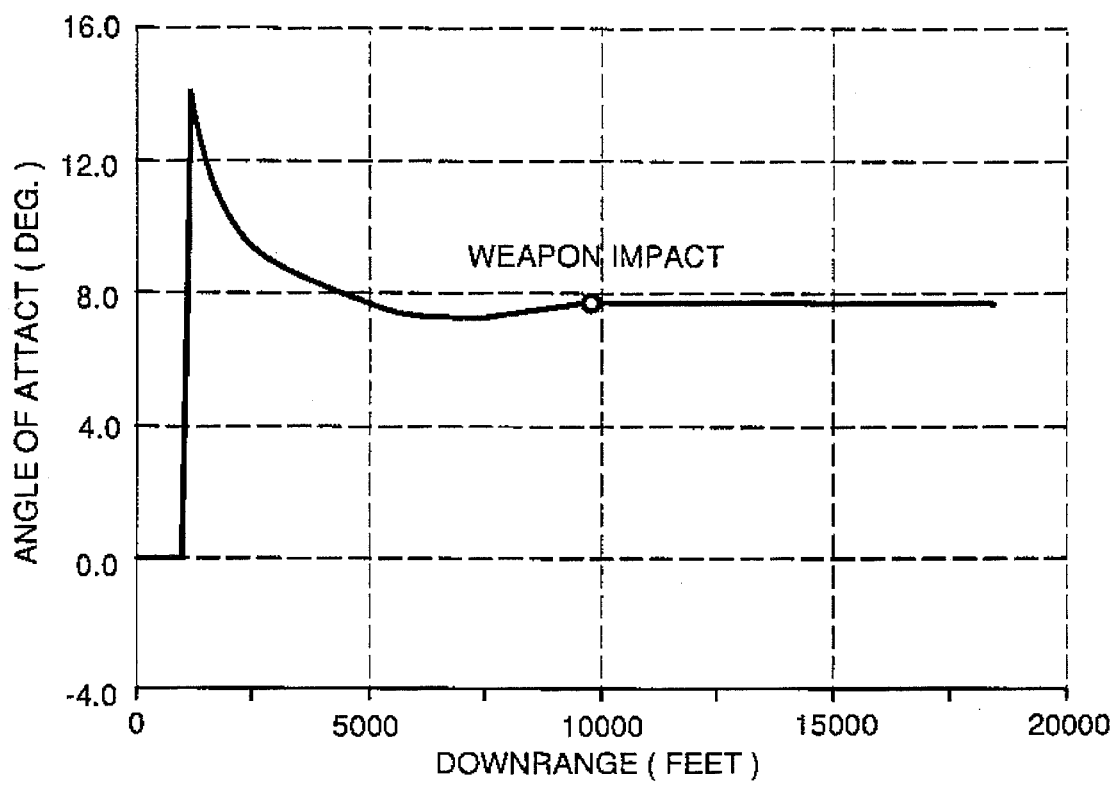
Figure 11:
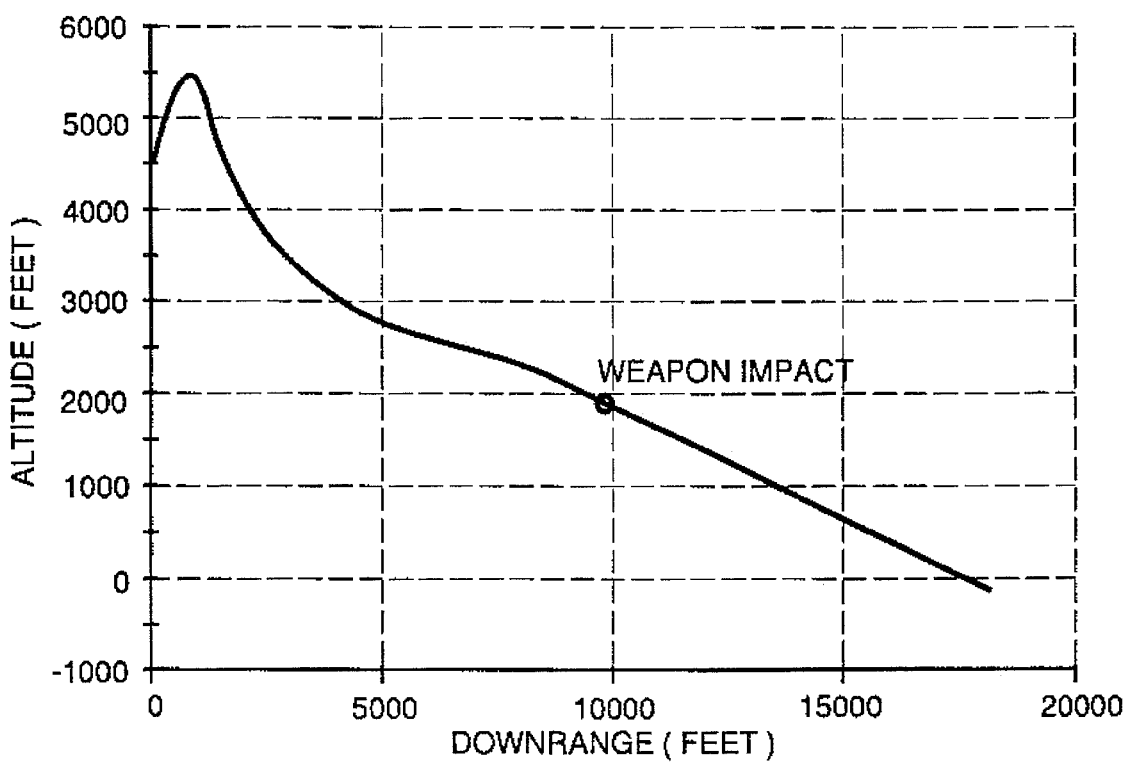
Figure 12:
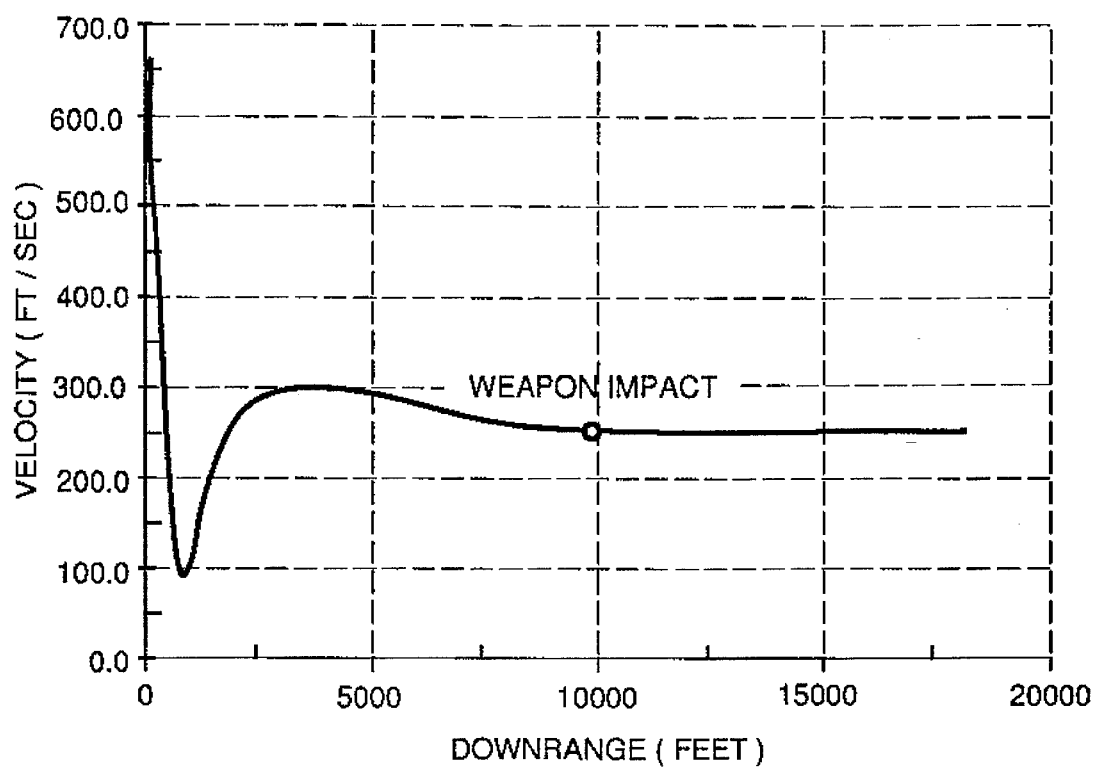
Figure 13:
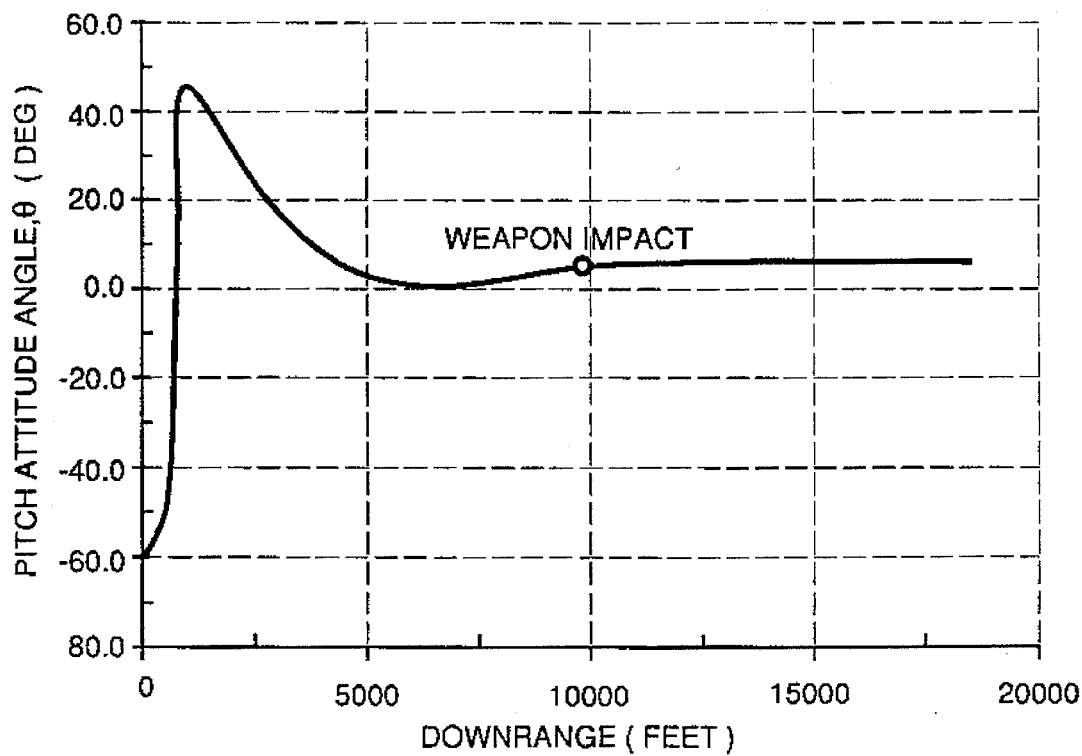
Figure 14:
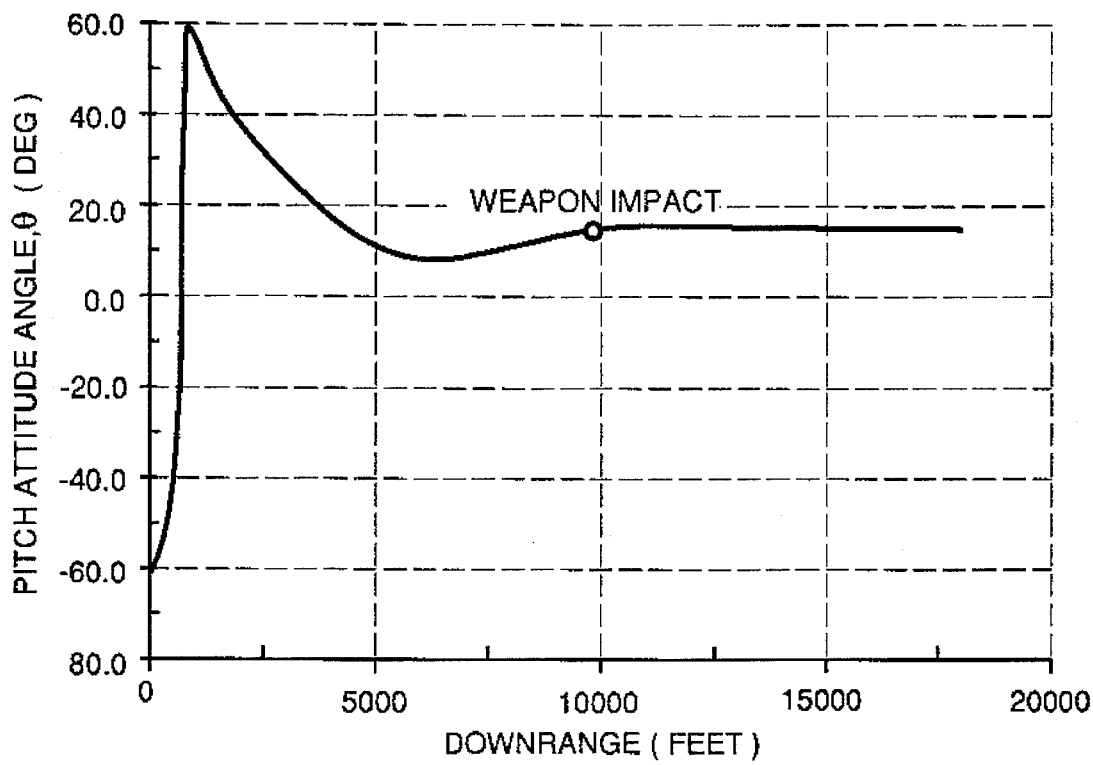
Figure 15:
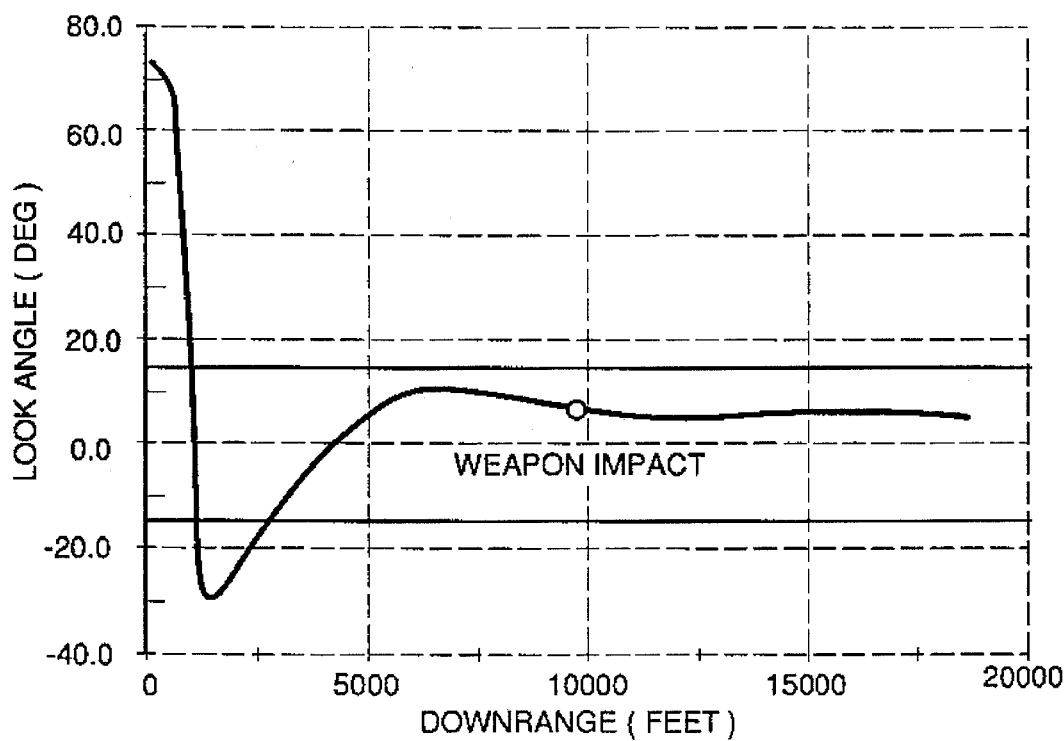

Referring to the drawing figures, FIG. 1 illustrates a weapon 11 deploying an all-aspect bomb damage assessment system 10 in accordance with the principles of the present invention. The all-aspect piggyback bomb damage assessment system 10 is piggybacked or otherwise secured to a weapon 11, such as a missile 11 or bomb 11, in a separate launch tube 12, for example. The system 10 may be stowed in a horizontal launch tube 12 and horizontally dispensed from the weapon 11 during its flight, or stowed in a lateral launch tube 12 and ejected from the weapon 11 during its flight in the manner of a mortar, for example. The all-aspect piggyback bomb damage assessment system 10 is designed to provide imagery of a bombed area immediately after weapon delivery. Two different embodiments of the system 10 are described herein with reference to FIGS. 2a–2d and FIG. 3a–3c, respectively. Furthermore, two versions of each of the bomb damage assessment systems 10 are described, including an all-aspect system 10, and a simplified single-aspect system 10.

Referring to FIG. 2a, details of one embodiment of the all-aspect bomb damage assessment system 10 are shown. The bomb damage assessment system 10 comprises a glider 20, having an eighteen-inch long body 21 with a two-inch circular cross section, for example. Spring loaded curved wings 22 fold on the top of the body 21. The wings 22 are provided with a dihedral shape that promotes roll stability of the glider 20. Four curved tail fins 23, driven by model airplane actuators 25, such as a model S9102 actuator 25 manufactured by Futaba Corporation, for example, are provided that are designed to move 60 degrees in 0.13 seconds, for example, to extend the fins 23. Other suitable actuators 25 are readily available from commercial model airplane suppliers. A release mechanism (not shown) releases the spring loaded wings 22 so that they extend and lock.

The glider 20 comprises several subsystems including an imaging sensor system 31, a guidance and flight control system 40, a data communications link 36, and a programmable processor 35 for controlling the glider 20 and the other subsystems. The imaging sensor system 31 may comprise a video camera 31 or an infrared camera 31, for example. A suitable infrared camera 31 may be a 256×256 element platinum silicide (PtSi) focal plane array cooled by a closed-cycle Stirling cooler or Argon gas, for example. The infrared camera 31 may be an InfraCam camera, manufactured by Inframetrics, for example. The glider 20 has a front optically transparent front window 32, which may be transparent to visible or infrared energy, depending upon the type of imaging sensor system 31 used in the system 10. The selected camera 31 is mounted on an azimuth axis gimbal 33, which is electrically coupled to the processor 35, and which is designed to rotate the viewing angle of the imaging sensor system 31 in accordance with programmed instructions stored in the processor 37.

The data communications link 36 may be provided by a conventional radio frequency data link 36 such as a 2 GHz low bandwidth data link 36. The data link 36 may be a model T-2200-FM4-1 data link manufactured by Microtec Electronics, for example. A battery 34 is housed inside the body 21 of the glider 20 and provides power for the processor 35, the gimbal 33, the radio frequency data link 36, and the guidance and flight control system 40 including the actuators 25. The glider 20 has a tail section 26 that houses a deployable ballute 27 (shown deployed in FIG. 2d). In addition, and in order to controllably decelerate the glider 20 a plurality of speed brakes 28 (shown deployed in FIG. 2d) may be provided.

For the purposes of completeness, FIG. 2b illustrates a partial view of the system 10 with wings 22 deployed, FIG. 2c illustrates a rear end view of the system 10 with tail fins 23 deployed, and FIG. 2d illustrates the system 10 in an operable gliding state having its deployable ballute 27 and speed brakes 28 deployed. Referring to FIG. 2e, it illustrates the operation of the glider 20 and the all-aspect piggyback bomb damage assessment system 10. More particularly, FIG. 2e shows the terminal trajectory of the weapon 11 (solid traces), for example, and the trajectory of the glider 20 (dashed traces), with time ticks to illustrate relative position. The camera 31 is designed to have a field of view of 30 degrees in elevation and 40 degrees in azimuth, for example. The centerline of this field of view is depressed by 10 degree, for examples. These parameters represent approximate angles that may be altered to fit different specific applications.

The glider 20 flies such the hot spot caused by impact of the weapon 11 moves downward in its field of view. When the hot spot reaches a predetermined depression angle relative to the enter of the field of view, the azimuth gimbal 33 is controlled to move slowly to the left, for example. A conventional hot spot tracker that is part of the guidance and flight control system 40 develops an error signal when the hot spot moves to the fight in the field of view, which causes the glider 20 to bank to the right, thus turning the glider 20 to the right. When the desired bank angle is reached, the rate of turn of the glider 20 matches the rate of turn of the azimuth gimbal 33.

As the azimuth gimbal 33 approaches 90 degrees, it stops rotating relative to the body 21 of the glider 20. The existing bank angle to the right causes the image of the hot spot to move to the left in the field of view of the camera 31, generating a signal that causes the glider 20 to roll to the left. This roll continues until the hot spot is centered in the field of view of the camera 31, and the glider 20 banks to the left. For example, if the azimuth gimbal 33 stops turning at 80 degrees relative to the centerline if the glider 20, then the path follows an inward spiral with a 10 degree inward pitch. This inward spiral reduces the range to the hot spot and improves the linear resolution. Thus the target area is viewed from all aspects as the glider 20 flies around the target area, first at long range when the image includes a large amount of background, and progressively closer resulting in less background but finer linear detail of the target area.

In addition to hot spot tracking, the glider 10 of the present invention may also employ GPS (global positioning system) guidance. In this instance, the glider 20 includes a GPS receiver 29 that is integrated into the guidance and flight control system 40. The target location in GPS coordinates is entered into the programmable processor 35 and guidance and flight control system 40. When the glider 20 is released from the weapon 11, it may be programmed using the programmable processor 35 and guidance and flight control system 40 to fly along a specific path or geometric surface in GPS coordinates, such as along a converging cone centered in the coordinates of the target, for example. Such programming is well-known to those skilled in the art.

Referring to FIGS. 3a–3c they illustrate top, front, and exposed side views of a second embodiment of the all-aspect piggyback bomb damage assessment system 10 of the present invention. FIG. 3a illustrates deployment of one of the spring loaded wings 22, in this case formed in the shape of a conventional glider wing that rotates from a stored position adjacent the body 21 to an extended position. The glider 20 may have an eighteen-inch long body 21 with a two-inch circular cross section, for example. Spring loaded wings 22 having a sixteen-inch span, for example, fold on the top of the body 21. FIG. 3b shows a front view of the glider 20 illustrating both wings 22 deployed. The field of view of the camera 31 is shown. FIG. 3c illustrates the internal components of the system 10 discussed hereinabove. More particularly, the body 21 houses the camera 31 mounted on the azimuth axis gimbal 33, the battery 34, the processor 35, the data link 36, four actuators 25, and the inflatable or deployable ballute 27. The camera 31 is used to track the weapon 11 after launch to its point of impact, and thereafter to track the hot spot on the ground left by the explosion. The ballute 27 is cut free when the deceleration phase of the glider 20 is complete. The weight of the glider 20 including all of its internal components and subsystems is about five pounds.

A single aspect version of the bomb damage assessment system 10 is constructed in the identically same manner as the all-aspect systems 10 described above, but is programmed to fly a path straight toward the target area behind the weapon 11 until a predetermined depression angle of the hot spot is reached. At this point the tracker in the guidance and flight control system 40 commands the glider 20 to slowly reduce the depression angle to about 8 degrees, for example, the angle of attack for a maximum lift to drag ratio (L/D), and hold the hot spot at this angle until impact with the hot spot is achieved, thus providing a series of images during the flight. This low cost version of the all-aspect bomb damage assessment system 10 may utilize a low cost video (TV) camera 31 instead of an infrared camera 31. In this version, parachute supported flares may be ejected over the target area to provide illumination at night.

In operation, the camera 31 operates at a rate of 30 or 60 Hz. Once every 3 seconds or so, a frame grabber that is part of the processor 35 places a scene into memory. The stored scene is then read out during the 3 second interval and is transmitted by way of the data link 36 to a command center, for example. Upon completion, another frame is grabbed and transmitted until impact with the ground occurs, resulting in a series of images that may be analyzed by command personnel.

For extending the observation time of the damage aftermath caused by the impact of the weapon 11 with a ground target, a reconfigurable glider 20 was designed and tested. In its compressed configuration, with wings 22, tail fins 23 and ballute 27 stowed, the glider 20 may be stowed and tube-launched from a weapon 11, such as is shown in FIG. 1. Wrap around tail fins 23 shown in FIG. 2a are used as the speed brakes 28 and the ballute 37 is deployed to significantly reduce the air speed of the glider 20. The glider 20 may be equipped with an extendable ring wing 22 comprising the wing 22 shown in FIG. 2a, for increased aerodynamic efficiency. The glider 20 may be may be tail-controlled to operate at a lift-to-drag ratio of about 4.5. The glider 20 may be flown along a shallow glide slope at relatively slow speeds such that it observes the target area prior to, during, and after impact of the weapon 11.

The predicted kinematics of the glider 20 in providing bomb damage assessment of the target area have been determined. FIGS. 4–15 illustrate graphs showing the performance of the all-aspect piggyback bomb damage assessment system 10. In view of the data contained in these graphs, compared to conventional bomb damage assessment techniques, the glider 20 provides longer observation times of the target area. FIG. 16 is a chart comparing the the present bomb damage assessment system 10 and a conventional parachute assisted assessment system. In addition, the glider 20 does not require a deployable parachute previously used to initiate its vertical descent above the target area. Consequently, issues of wind effects on the dynamic behavior of the parachute and its altered flight path are nullified.

The present invention provides high quality bomb damage assessment imagery on a timely basis, typically within two to five minutes of the impact of the weapon 11. In a multi-weapon attack, each weapon 11 is reported independently. The bomb damage assessment system 10 is readily adaptable for use with many large weapons 11, such as missiles or bombs including GBU-15, GBU-130, ALCM, GBU-24, GBU-28, JDAM, JSOW, TSSM, Popeye, Mk-84, for example.

Thus there has been described new and improved bomb damage assessment systems that may be carried and deployed by a weapon to provide imagery of a bombed target area before and after weapon impact. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A damage assessment system that is releasably secured to a weapon for providing imagery of a target area before and after impact of the weapon at the target area, said system comprising:

a glider comprising:

a body;

a plurality of folded wings and tail fins that are deployable from the body;

an imaging system disposed at a front end of the glider;

a folded deployable ballute disposed at a rear end of the that is deployable to decelerate the glider;

control means for controlling the flight path of the glider and for causing the glider to fly a predetermined flight path that permits the imaging system to view the target area from all aspects; and a data link for coupled to the imaging system for transmitting images derived from the imaging system to a remote location that permits assessment of the damage caused by the weapon.

2. The system of claim 1 wherein the imaging system comprises a television camera.

3. The system of claim 1 wherein the imaging system comprises an infrared camera.

4. The system of claim 3 wherein the infrared camera comprises a detector array.

5. The system of claim 4 wherein the detector array comprises a platinum silicide detector array.

6. The system of claim 1 wherein the control means causes the glider to fly a path straight toward the target area until a predetermined depression angle to the hot spot is reached, whereafter the glider is controlled to reduce the depression angle to a predetermined angle, and hold the hot spot at this angle until the glider impacts the hot spot.

7. The system of claim 6 wherein the imaging system comprises a television camera.

8. The system of claim 6 wherein the imaging system comprises an infrared camera.

9. The system of claim 8 wherein the infrared camera comprises a detector array.

10. The system of claim 9 wherein the detector array comprises a platinum silicide detector array.

11. The system of claim 1 wherein said control means comprises means for controlling the flight path of the glider in response to signals derived from the imaging system to track the weapon to impact and to track a hot spot produced by an explosion of the weapon, and to track the hot spot until a preselected depression angle is reached, to cause the glider to turn until the hot spot is at a predetermined angle relative to the centerline thereof, which causes the glider to glide in a spiral glide path around the hot spot so that the target area is viewed from all aspects.

12. The system of claim 1 further comprising a GPS receiver, and wherein said control means controls the flight path of the glider in response to signals programmed into the GPS receiver that cause the glider to fly along a predetermined path in GPS coordinates toward the target so that the target area is viewed from all aspects.

13. A damage assessment system that is releasably secured to a weapon for providing imagery of a target area before and after impact of the weapon at the target area, said system comprising:

a glider comprising:

a body;

a plurality of folded wings and tail fins that are deployable from the body;

an imaging system disposed at a front end of the glider;

a folded deployable ballute disposed at a rear end of the that is deployable to decelerate the glider;

control means for controlling the flight path of the glider in response to signals derived from the imaging system to track the weapon to impact and to track a hot spot produced by an explosion of the weapon, and to track the hot spot until a preselected depression angle is reached, to cause the glider to turn until the hot spot is at a predetermined angle relative to the centerline thereof, which causes the glider to glide in a spiral glide path around the hot spot so that the target area is viewed from all aspects; and a data link for coupled to the imaging system for transmitting images derived from the imaging system to a remote location that permits assessment of the damage caused by the weapon.

14. A damage assessment system that is releasably secured to a weapon for providing imagery of a target area before and after impact of the weapon at the target area, said system comprising:

a glider comprising:

a body;

a plurality of folded wings and tail fins that are deployable from the body;

an imaging system disposed at a front end of the glider;

a folded deployable ballute disposed at a rear end of the that is deployable to decelerate the glider;

a GPS receiver;

control means for controlling the flight path of the glider in response to signals programmed into the GPS receiver that cause the glider to fly along a predetermined path in GPS coordinates toward the target so that the target area is viewed from all aspects; and a data link for coupled to the imaging system for transmitting images derived from the imaging system to a remote location that permits assessment of the damage caused by the weapon.

* * * * *